Patented Sept. 20, 1938

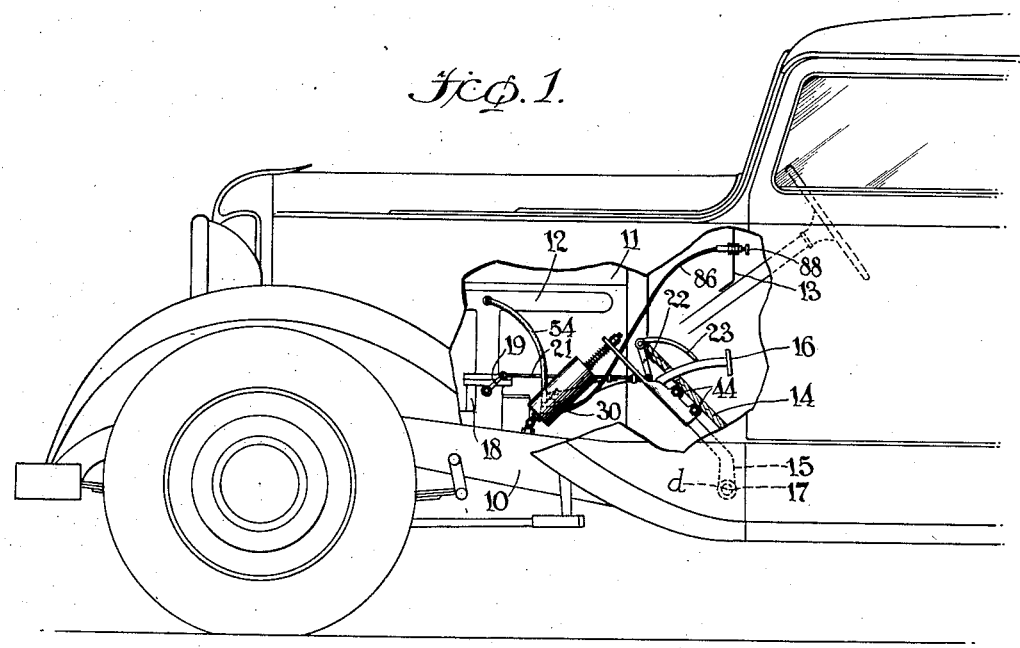
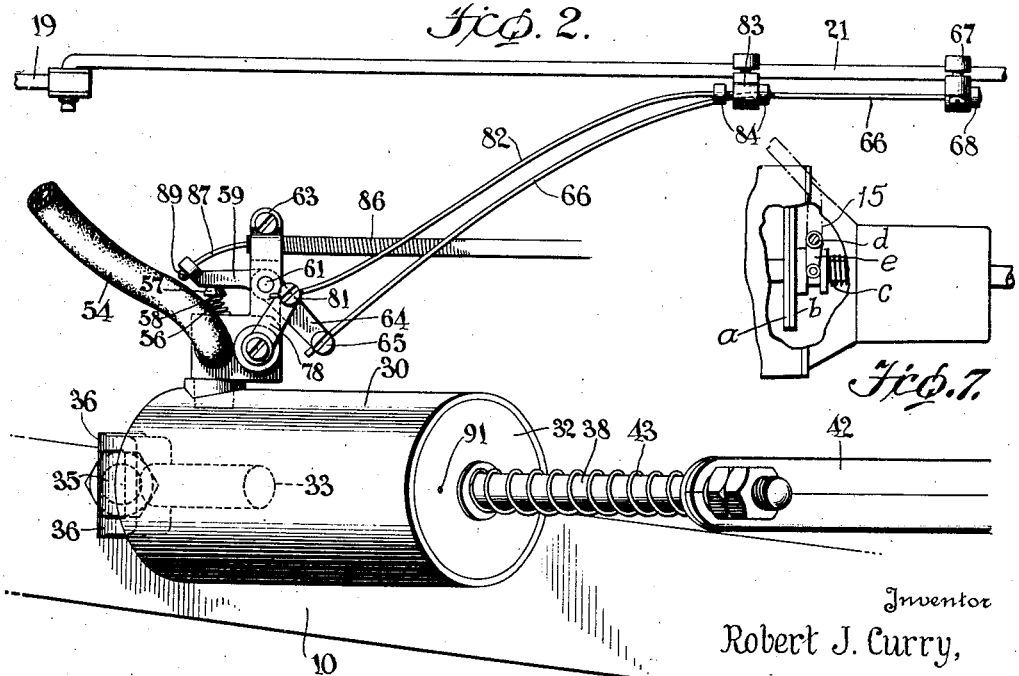

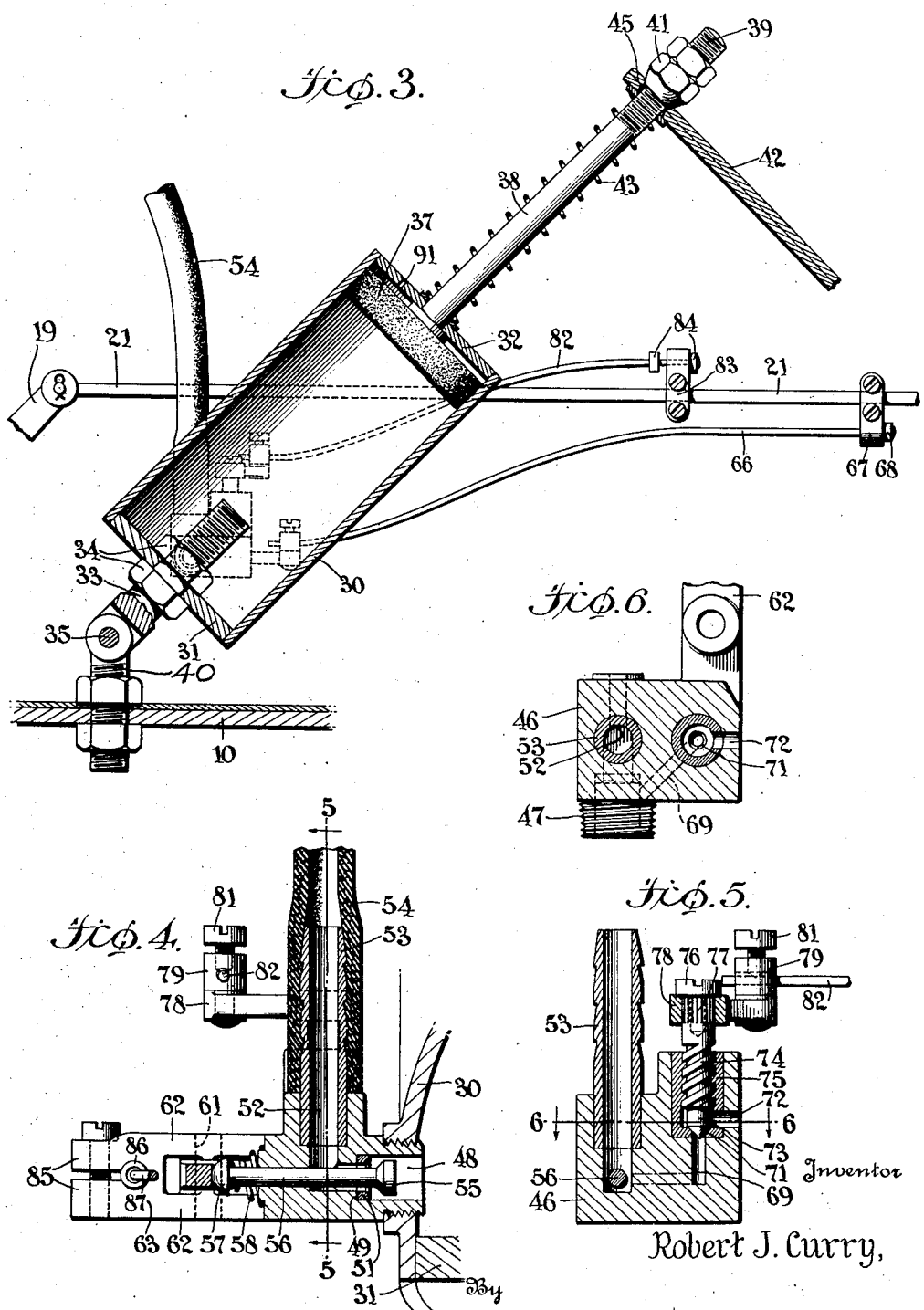

2,130,877

UNITED STATES PATENT OFFICE 2,130,877

SUCTION OPERATED CLUTCH

Robert J. Curry, Buffalo, N. Y.; Henry B. Staples, trustee in bankruptcy of Robert J. Curry, assignor, by mesne assignments, of one-half interest to Bendix Products Corporation, South Bend, Ind.

Application May 20, 1931, Serial No. 538,840

7 Claims. (Cl. 192—.01)

This invention relates to an automobile accessory for automatically operating the clutch lever in accordance with the movements of the throttle in order to dispense with the necessity of manual operation of the clutch pedal during gear shifting operations and in order to allow the vehicle to coast.

Heretofore devices have been designed comprising a cylinder, and a piston movable in the cylinder and connected to the clutch pedal, the cylinder being connected to the intake manifold of the engine whereby suction maintaining in the intake manifold may be effective to move the piston in the cylinder and thus actuate the clutch. It has been found that different types of vehicle clutches require engagement and disengagement at different rates in order to insure smooth operation of the vehicle during the periods when the vehicle is being started and when the gears are being shifted. It has also been found that in different vehicles the throttle is controlled by different arrangements of control levers and linkage. For these reasons and others, devices heretofore known, for this general purpose, have been deficient, since they required structural changes in order to adapt them to each particular vehicle.

The present invention relates to an automatic clutching device which is structurally adapted for application to any one of a plurality of vehicles of different designs and proportions. It includes means for regulating the admission of air to the cylinder in accordance with the position of the throttle and also a manual adjustment therefor whereby the return of the clutch operating lever to a normal engaged position may be effected at varying rates of speed, dependent upon the type of clutch on the particular vehicle.

The invention further comprehends a novel control means for the suction line extending from the engine manifold to the operating cylinder, which comprises a single unit connected by a single passage to the cylinder, whereby the unit may be so adjusted relative to the cylinder that it may be conveniently connected to the throttle linkage of any particular vehicle. It further comprehends means for adjusting the length of piston stroke whereby it may be made to correspond to the clutch stroke of any particular vehicle, the same means serving to prevent complete closure of the passage between the intake manifold and the cylinder by the piston.

In order to further adapt the device for attachment to a vehicle, without modifying the existing structure thereof, a novel linkage is provided between the clutch operating lever and the operating piston and cylinder, comprising an extension lever adapted to be removably and rigidly affixed to the clutch operating lever, or pedal of the vehicle and having play connection with the link which connects the piston in the operating cylinder. Spring means are provided between the extension lever and cylinder in order to urge the clutch operating lever to its normal or engaged position so that the device will not "ride" the clutch to cause excessive wear of the clutch throw out bearing.

These and other objects and advantages, including those arising from the specific formation and arrangement of the component parts of the device, will become apparent from the following description of one typical embodiment of the invention, reference being made to the accompanying drawings wherein:—

Fig. 1 is a side elevational view of the automatic clutching device of the invention as applied to a conventional motor vehicle;

Fig. 2 is a plan view, on a larger scale, of the apparatus shown in Fig. 1;

Fig. 3 is a vertical cross-sectional view through the operating cylinder of the device shown in Figs 1 and 2;

Fig. 4 is a vertical cross-section through the valve mechanism of the device;

Fig. 5 is a vertical cross-section taken at right angles to Fig. 4 on line 5—5 thereof;

Fig. 6 is a horizontal sectional view taken on line 6—6 of Fig. 5; and

Fig. 7 is a vertical sectional view through a fragmentary portion of the vehicle and showing a conventional clutch mechanism.

The vehicle shown in Fig. 1 is of conventional design, having a frame 10, a motor 11 with an intake manifold 12, an instrument panel 13, and a dash or foot board 14. Beneath the latter and connected to the engine is a clutch having an operating lever 15 with a pedal extremity 16, the lever being adapted to be moved in a counter-clockwise direction, as viewed in Fig. 1, about a horizontal axis 17 of a shaft $d$ to disengage the clutch and being automatically returnable to the position shown for engagement. The clutch mechanism which may be of any suitable form illustrated in Fig. 7 as comprising a drive member $a$ and a driven member $b$ adapted to be normally held in engagement with the drive member by a spring $c$. The clutch members may be disengaged by depressing the pedal 16, thereby rotating the shaft $d$, which has a lever $e$ for retracting the driven member $b$ against the pressure of spring $c$. The vehicle is provided with a carburetor 18 having a throttle lever 19 and a link 21 connecting the lever 19 to a second lever 22 movable with an accelerator or throttle pedal 23, so that upon depression of the pedal 23 the link will be moved forwardly, or to the left as shown in Fig. 1, to effect opening of the throttle, any usual means being provided for returning the pedal to a normal position, and thus closing the throttle, when pressure upon the pedal is released.

The device of the present invention includes a cylinder 30 having inner and outer closed ends 31 and 32 respectively. The inner end of the piston has an opening for receiving an adjusting shank 33 which is threaded and is provided on opposite sides of the closure 31 with securing nuts 34, the shank being pivoted, as shown in Figs. 2 and 3, at 35, to bifurcated ends 36 of a bolt 40 which is affixed to the vehicle frame 10. A piston 37 within the cylinder 30 has connected thereto a piston rod 38 which extends through the closure 32 and has its outer end 39 threaded for receiving an adjustable nut 41 which retains the end of the detachable clutch lever extension 42 on the rod 38, a spring 43 being disposed about the rod 39 between the closure 32 and the extension lever 42 for normally retaining the latter against the retaining means 41.

The extension lever may be of any suitable form, being illustrated as comprising a metal stamping of a substantially U cross section at one end thereof and having the legs of the U clamped together about the lever 15 by means 44. The aperture 45 which receives the piston rod 39 has rounded edges and is of slightly larger diameter than the piston rod to accommodate slight angular movement of the rod and lever, the engaging face of the retaining nut 41 being likewise rounded for this purpose.

Connected to the inner end of the cylinder is the unitary control valve means illustrated in Figs. 4, 5 and 6. These include a valve body 46, having a threaded extension 47 for attachment to the cylinder 30. A passage 48 is provided through the extension 47 into the interior of the valve body, terminating in a shoulder portion 49 supporting a valve seat 51. Communicating with the opening through the valve seat is a passage 52 terminating in a nipple 53 to which is attached a suitable conduit 54 extending to the intake manifold 12 of the vehicle. Passage of fluid through the passages 48, 52, 54 is controlled by a valve 55, having a stem 56 extending through the valve body and terminating in a head 57, a coiled spring 58 being disposed between the head and the valve body for normally holding the valve against its seat 49. A bell crank lever having an arm 59 normally engaging the head 57 is pivoted at 61 to the walls 62 of a slotted extension 63 of the valve body, and has its other arm 64 pivotally connected at 65 to a control rod or link 66, which extends through and has sliding engagement with a clip 67 affixed to the throttle link 21, a head 68 being formed on the end of the rod 66 for abutment by the clamp 67 when the throttle control link moves to its extreme throttle closing position or to the right as the device appears in Figs. 1, 2 and 3.

Extending from the opening 48 as shown in Fig. 6 is a passage 69, this passage being superposed in broken lines in Fig. 5, which terminates in a valve seat 71 and communicating with an atmospheric vent opening 72. A valve 73 adapted to seat upon the seat 71 has high pitch screw threads 74 for threaded engagement with a bushing 75 which is inserted in and forms a part of the body 46. The outer end of the valve 73 is headed by a removable member 76 and is provided with flutes for receiving, in a plurality of angular positions about its axis, a lever 78, the outer end of the lever being provided with a bearing member 79 and clamping means 81 for pivotally connecting a release rod or link 82. The latter extends through a second clip 83 affixed to the throttle link 21 and has slidable movement relative thereto limited by a pair of stop members 84, one of which is located on each side of the clip for abutment thereby in a manner to be more fully described hereinafter.

Clamped between the bifurcated ends 85 of the valve body extension 63 is a tubular housing 86 which extends to the instrument panel 13 or other readily accessible point within the driver's compartment of the vehicle. A control wire 87 extends through the tubular housing 86 and terminates in a handle 88. The opposite end of the wire 87 extends through the end of the arm 59 of the bell crank lever and terminates in a stop 89 for abutment with the end of the arm.

In operation, when no pressure is applied to the accelerator pedal 23, it will be moved by conventional spring means (not shown) to throttle closing position. Here, as shown in Fig. 1, the link 21 will be in its extreme position after movement to the right, and clip 67 will be in abutment with the head 68 of the flexible control rod or link 66. The latter, by means of bell crank lever 64 will hold open valve 55 against the resistance of spring 58, so that suction maintaining in the intake manifold 12 will be effective through conduit 54 and passages 52, 48 to reduce the fluid pressure within cylinder 30 to less than atmospheric. Simultaneously air under atmospheric pressure will be effective in the cylinder on the opposite side of the piston by reason of a vent opening 91 in the cylinder cover 32. Accordingly the piston 37 will be moved inwardly into abutment with shank 33, thus moving the clutch lever 15 in a counter-clockwise direction, as viewed in Fig. 1, to cause disengagement of the clutch.

When the pedal 23 is depressed, to cause link 21 to move forwardly to open the throttle, the clip 67 will be moved out of abutment with head 68 or link 66, allowing the spring 58 to return the valve 55 to its seat and thereby destroying communication between the intake manifold and the cylinder. Forward movement of the link 21 will also cause clip 83 to abut stop 84 on rod 82 and move the rod forwardly to effect counter-clockwise movement of lever 78 as viewed in Fig. 2. Thus valve 73 will be opened allowing air to enter the cylinder through vent opening 72, 69, dissipating the partial vacuum in the cylinder and allowing spring 43 and the clutch spring to return clutch lever 15 to the normal position, shown in Fig. 1, in which the clutch is engaged.

It will be understood that any desired rate of return movement of the piston 37 may be obtained by adjusting the angular relationship of the lever 78 with the valve 73, such adjustment being effected by removing the member 76 and the lever 78 from the valve 73 and by replacing the lever 78 in a different angular relation to, about the axis of, the valve 73, and also by adjusting the position of the clip 83 upon the link 21. Thus, the valve 73 may be either partially or entirely closed when the throttle is in closed or idling position and may be opened either upon initial opening position of the throttle or during medial phases of throttle-opening movement of the link 21, depending upon the characteristics peculiar to the motor vehicle to which the device is attached and the option of the operator or owner of such vehicle. Likewise the rate at which the clutch is disengaged or at which the piston 37 is drawn inwardly to the piston 37 may be varied by adjusting the clip 67 longitudinally along the link 21.

It will be understood that during the operation of a vehicle having this attachment, release of pressure upon the throttle pedal will cause disengagement of the clutch, so that gears may be changed or shifted without manual depression of the clutch pedal, and that upon acceleration of the motor or opening of the throttle the clutch will be automatically engaged. In addition to its utility in relieving the driver of manually depressing the clutch when shifting gears the device will also function to allow the vehicle to "free wheel" whenever the throttle is closed or pressure is released from the accelerator pedal.

In the event that it should become desirable to disconnect the device from operation the handle 88 attached to the control wire 87 may be moved to the right, as the device is viewed in Fig. 1, thus effecting clockwise rotation of the bell crank lever, as it is viewed in Fig. 2, and thereby holding the lever against any movement by the link or rod 66 which might tend to open communication between the manifold and the cylinder. When, during operation of the vehicle the handle 88 is retracted, the vehicle will accordingly function in the usual manner, necessitating depression of the clutch pedal during gear shifting operations. When, at such times, pressure on the accelerator pedal 23 is released, the link 21 will not cause movement of the bell crank lever 59, 64, since the rod or link 66 is sufficiently flexible to accommodate such slight movement.

It will be understood that when the vehicle clutch pedal is thus manually operated the friction of the piston 37 with the walls of the cylinder 3 need not be overcome by the operator, since the lever 42 may move inwardly relative to the piston rod against the compression of the spring 43. The latter has the additional utility of normally retaining the clutch pedal in full clutch-engaged position so that all drag is removed from the clutch throw out bearing.

In the application of the device to a motor vehicle, the cylinder 30 may be adjusted longitudinally of the shank 33 by turning the nuts 34 so that the inward limiting position of the piston 37 within the cylinder may be regulated, and by this adjustment together with adjustment of the nut 41 upon the rod 38, the stroke of the piston 37 may be regulated to conform to the throw of the vehicle clutch. The shank 33 has the additional utility of at all times preventing the piston 37 from moving to such position as to overlie and close the passage 48, which might result in the clutch lever being lodged in clutch-disengaging position.

It will be understood that the device is readily adapted for mounting upon different types of vehicles, since the cylinder 30 may be turned about the axis of the shank 33 to bring the valve body 46 to varying positions relative to the position and since the valve body may be turned about the axis of its threaded extension 47 to bring the lever arms 78 and 64 into a position convenient for attachment to such linkage, as 21, with which the vehicle may be provided, without altering such linkage.

It will also be understood that the terms "cylinder" and "piston" as herein used comprehend generally any types of fluid pressure operable means, such as those of the cylinder and diaphragm or vane types, for effecting mechanical movement, and further that the specific embodiment of the invention herein described is merely illustrative of the principles of the invention, which may be applied, within the scope of this invention, to other devices which have other structural characteristics and arrangements.

What is claimed is:

1. A clutch operating accessory for vehicles having a clutch and a clutch operating lever therefor, comprising a cylinder mounted upon the vehicle, a piston movable in the cylinder, a rod connected to the piston at one end and extending through the cylinder, an extension lever attached to the clutch operating lever and having an aperture receiving the rod, adjustable means upon the rod for engaging the extension lever to cause it to move with the rod, and a spring between the cylinder and the extension lever for normally retaining the extension lever against the adjustable engaging means.

2. A clutch operating accessory for vehicles, comprising an extension lever and means for detachably connecting it to a clutch operating lever of the vehicle, a cylinder adapted to be mounted upon the vehicle, a piston in the cylinder, and a rigid link connecting the extension lever and the piston, said link being movable relative to the lever, means for limiting relative movement of the lever and link, and resilient means normally holding the lever and link in limit position.

3. A clutch operating accessory for vehicles having a clutch control lever, comprising a cylinder, a shank extending into the inner end of the cylinder and adjustable longitudinally therein, pivotal means for connecting the shank to the vehicle, a piston in the cylinder and a rigid link connecting the piston to the clutch control lever.

4. A clutch operating accessory for vehicles having a clutch control lever, comprising a cylinder, a shank extending into the inner end of the cylinder and adjustable longitudinally therein, pivotal means for connecting the shank to the vehicle, a piston in the cylinder and a piston rod slidably engaging the clutch control lever, means on the rod engageable with the lever when the piston and rod move inwardly, said means being adjustable longitudinally of the rod, and a spring for normally urging the means into engagement with the lever.

5. A clutch operating accessory for vehicles having a throttle control comprising a cylinder, a piston movable in the cylinder and means for connecting the piston to the clutch, a conduit connecting the cylinder to a source of fluid pressure, and valve means mounted upon the cylinder for controlling the passage of fluid through said conduit, and control linkage connecting the valve means to the throttle control whereby the passage of fluid may be controlled by said throttle control, means for adjusting said cylinder angularly about its longitudinal axis and means for adjusting said valve means angularly about an axis substantially normal to said first-mentioned axis.

6. A clutch operating device for vehicles comprising fluid pressure operated means for moving the clutch to disengaged position, a conduit connecting said means to a source of suction, a valve normally closing said conduit to fluid passage, means including a lever for opening said valve, and independent manually operable means for engaging said lever to render the valve opening means inoperative.

7. A clutch operating device for vehicles having a throttle control comprising fluid pressure operated means for operating the clutch, a conduit connecting the means to a source of suction, a valve normally closing said conduit to fluid passage, means operable by the throttle control for opening said valve, means including a valve for admitting atmospheric air to said first-mentioned means, said last mentioned valve being manually adjustable to vary the limits of fluid passage through the means for admitting air, and means connecting said last mentioned valve to said throttle control for opening and closing movement thereby within the limits determined by the manual adjustment.

ROBERT J. CURRY.